US007563198B2

United States Patent
Ayabe et al.

(10) Patent No.: US 7,563,198 B2
(45) Date of Patent: Jul. 21, 2009

(54) SHIFT CONTROL DEVICE AND SHIFT CONTROL METHOD OF AUTOMATIC TRANSMISSION

(75) Inventors: Atsushi Ayabe, Nagoya (JP); Toshio Sugimura, Nagoya (JP); Ayumu Sagawa, Toyota (JP); Takahiko Tsutsumi, Toyota (JP); Hisashi Ishihara, Toyoake (JP); Kazuhiro Iketomi, Nagoya (JP); Yosuke Takaie, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 423 days.

(21) Appl. No.: 11/603,202

(22) Filed: Nov. 22, 2006

(65) Prior Publication Data

US 2007/0117676 A1 May 24, 2007

(30) Foreign Application Priority Data

Nov. 24, 2005 (JP) .............................. 2005-338943

(51) Int. Cl.
*F16H 61/26* (2006.01)
(52) U.S. Cl. ..................... 477/132; 477/135; 477/139; 477/140
(58) Field of Classification Search ................. 477/132, 477/135, 139, 140
See application file for complete search history.

(56) References Cited

U.S. PATENT DOCUMENTS

| 6,346,063 | B1 | 2/2002 | Kondo et al. |
| 6,554,741 | B2 * | 4/2003 | Saito .......................... 477/120 |
| 7,089,102 | B2 * | 8/2006 | Slayton et al. ................ 701/51 |

FOREIGN PATENT DOCUMENTS

| JP | 9-60717 A | 4/1997 |
| JP | 11-082712 | 3/1999 |
| JP | 2000-097331 A | 4/2000 |
| JP | 2001-65680 A | 3/2001 |
| JP | 2006242266 A * | 9/2006 |

* cited by examiner

*Primary Examiner*—Ha D. Ho
(74) *Attorney, Agent, or Firm*—Sughrue Mion, PLLC

(57) ABSTRACT

A shift control device of a vehicular automatic transmission that establishes a plurality of gear steps of different speed change ratios by selectively engaging a plurality of friction engagement devices ends the shift control by making an engagement end determination regarding an engagement-side friction engagement device if it has been determined continuously for a predetermined time that the input shaft rotation speed of the automatic transmission is in the vicinity of the synchronous rotation speed of the post-shift gear step. The predetermined time is set at a first time if the downshift is a power-on downshift due to a shift judgement in a power-on state, and is set at a second time that is shorter than the first time if the downshift is a power-off→on downshift selected in connection with a change to the power-on state during a power-off shift due to the shift judgment in a power-off state.

12 Claims, 9 Drawing Sheets

SHIFT CONTROL DEVICE AND SHIFT CONTROL METHOD OF AUTOMATIC TRANSMISSION

INCORPORATION BY REFERENCE

The disclosure of Japanese Patent Applications No. 2005-338943 filed on Nov. 24, 2005, including the specification, drawings and abstract, is incorporated herein by reference in its entirety.

BACKGROUND OF THE INVENTION

1. Field of the Invention

The invention relates to a shift control device and a shift control method of an automatic transmission that performs a downshift through the engagement switch between friction engagement devices. In particular, the invention relates to a technology that shortens the required time in making a determination of the end of engagement of an engagement-side friction engagement device on the basis of the input shaft rotation speed.

2. Description of the Related Art

An automatic transmission that establishes a plurality of gear steps of different speed change ratios by selectively engaging a plurality of friction engagement devices is widely used in motor vehicles and the like. An example thereof is a technology described in Japanese Patent Application Laid-Open Publication No. HEI 9-60717 in which when a downshift is performed by the engagement switch between a release-side friction engagement device and an engagement-side friction engagement device, the fashion of change in the oil pressure on the friction engagement devices differs depending on whether the downshift is a power-on downshift or a power-off downshift. Specifically, at the time of a power-on state, the input shaft rotation speed rises on its own whereas at the time of a power-off state, the input shaft rotation speed does not rise on its own. Therefore, generally, the power-on downshift is performed while the sharp rise in the input shaft rotation speed is restrained by the release-side oil pressure. On the other had, the power-off downshift is generally performed by releasing the release-side friction engagement device early and raising the input shaft rotation speed by the engagement-side oil pressure. Besides, as shown in Japanese Patent Application Publication JP-A-2001-65680, there occurs a case where an accelerator-on operation is performed halfway through a power-off downshift. In such a case, the downshift is performed while the sharp rise in the input shaft rotation speed is restrained by a hydraulic control of the engagement-side friction engagement device or a torque control of the motor.

Incidentally, when it is determined that the input shaft rotation speed is in a neighborhood of the synchronous rotation speed of the post-shift gear step, an engagement end determination indicating that the engagement of the engagement-side friction engagement device has ended is made, and then the shift control is ended by, for example, raising the oil pressure to a maximum value, or the like. In that case, in order to prevent a false determination from being made regarding the engagement end determination, the engagement end determination is made provided that the determination continues to hold over a predetermined time. For example, in the case of the power-on downshift, since the shift is performed while the sharp rise in the input shaft rotation speed is restrained by the release-side oil pressure, it is not immediately distinct whether the dwell of the input shaft rotation speed in the vicinity of the synchronous rotation speed has been caused by the release-side oil pressure or the engagement-side oil pressure. Therefore, there is a need to confirm that the input shaft rotation speed is kept in the vicinity of the synchronous rotation speed despite a further drop of the release-side oil pressure, before making the engagement end determination. Thus, there is a need to set a relatively long determination time.

However, if the determination time is set long in order prevent a false determination, the shift time becomes long. Therefore, in a case where an accelerator-on operation is performed during a power-off downshift, the shift requires a time despite the driver's request for a driving power, that is, it takes a long time until a desired driving power is obtained, causing an uncomfortable feeling to the driver. In particular, in a case where such an accelerator-on operation has caused a judgment for a multiplex downshift that involves a further downshift to a gear step that is lower than the gear step that needs the engagement switch between friction engagement devices in order to input torque from the motor, a downshift to an intermediate relay gear step is first performed, and after the shift control to the relay gear step ends, the next shift is performed. Therefore, the time of dwell at the driving power of the relay gear step becomes long if the aforementioned determination time is long. Thus, the aforementioned problem becomes conspicuous.

SUMMARY OF THE INVENTION

The invention has been accomplished against the background of the aforementioned circumstances, and provides a shift control device and a shift control method of an automatic transmission in which a shift control is ended after it is determined that the engagement of an engagement-side friction engagement device has ended on the basis of the input shaft rotation speed, and the time required for the engagement end determination is shortened as much as possible.

Accordingly, there is provided an shift control device of a vehicular automatic transmission that establishes a plurality of gear steps of different speed change ratios by selectively engaging a plurality of friction engagement devices. The shift control device includes the following two controllers: a first controller that performs a shift control for causing execution of a downshift through engagement switch between a release-side friction engagement device and an engagement-side friction engagement device; and a second controller that ends the shift control by making an engagement end determination regarding the engagement-side friction engagement device if it has been determined for a predetermined time that an input shaft rotation speed of the automatic transmission is in a vicinity of a synchronous rotation speed of a post-shift gear step. The second controller sets the predetermined time at a first time if the downshift is a power-on downshift due to a shift judgment in a power-on state, and the second controller sets the predetermined time at a second time that is shorter than the first time if the downshift is a power-off→on downshift selected in connection with a change to the power-on state during a power-off shift due to the shift judgment in a power-off state.

According to another aspect of the invention, there is provided a shift control method of a vehicular automatic transmission that establishes a plurality of gear steps of different speed change ratios by selectively engaging a plurality of friction engagement devices. This shift control method includes the following controls: performing a shift control for causing execution of a downshift through engagement switch between a release-side friction engagement device and an engagement-side friction engagement device; ending the shift control by making an engagement end determination regarding the engagement-side friction engagement device if it has been determined for a predetermined time that an input shaft rotation speed of the automatic transmission is in a vicinity of a synchronous rotation speed of a post-shift gear step; setting the predetermined time at a first time if the downshift is a power-on downshift due to a shift judgment in a power-on state; and setting the predetermined time at a second time that is shorter than the first time if the downshift is a power-off→on downshift selected in connection with a change to the power-on state during a power-off shift due to the shift judgment in a power-off state.

According to the shift control device and the shift control method of the automatic transmission described above, the engagement end determination is performed as follows. In the case of a power-off→on downshift selected in connection with a change to the power-on state during a power-off shift, the second time which is shorter than the first time used in the case of a power-on downshift that is performed in the power-on state from the beginning is set from the beginning as a predetermined time for the engagement end determination. Therefore, the shift time can be shortened while a false determination in the engagement end determination is prevented. Thus, it becomes possible to promptly obtain a desired driving power and restrain the incidence of causing an uncomfortable feeling to the driver.

That is, in a power-off→on downshift selected in connection with a change to the power-on state during a power-off shift, the release-side friction engagement device is released in the power-off stage in the case where a remaining-the-same shift (downshift) whose shift target remains unchanged is maintained despite the change of the power state; on the other hand, in the case of a multiplex shift in which the shift target changes, the state of engagement of the release-side friction engagement device is not known, and therefore normally is promptly released. Therefore, in either case, the downshift is performed while the sharp rise in the input shaft rotation speed is restrained through the hydraulic control of the engagement-side friction engagement device, or the torque-down control of the motive power source that is performed if necessary, etc. Therefore, there is no possibility of the dwell of the input shaft rotation speed in the vicinity of the synchronous rotation speed being due to the release-side oil pressure. Hence, as it is considered that the dwell is due to the engagement of the engagement-side friction engagement device, the engagement end determination can be made in a short time (second time).

The invention is suitably applied to vehicular automatic transmissions, and can be applied to various vehicular automatic transmissions in, for example, engine-driven vehicles that generate driving power through the combustion of fuel, electric motor vehicles that are run by electric motors, etc. Examples of the automatic transmission in the invention include various automatic transmissions that establish a plurality of gear steps in accordance with the states of actuation of a plurality of clutches and brakes, such as automatic transmissions of a planetary gear type, a parallel-axes type, etc.

As for the friction engagement devices, hydraulic type devices are suitably used. The oil pressure (engagement force) is changed in a predetermined change pattern or at predetermined timing by, for example, a hydraulic control using solenoid valves or the like, or the operation of an accumulator, etc., so as to perform the shift control. However, other types of friction engagement devices, such as electro-magnetic type devices and the like, may also be used. These friction engagement devices are, for example, single-plate type or multi-plate type clutches and brakes that are engaged by actuators, such as hydraulic cylinders and the like, as well as belt-type brakes, etc.

The invention is particularly effective in the case where during a power-off downshift (first shift) based on a shift judgment in the power-off state, the power state changes to the power-on state due to an accelerator-on operation, and therefore a judgment for the downshift to a gear step that is lower than the gear step that needs the engagement switch between input clutches, and where a multiplex shift (second shift) of temporary downshift to an intermediate relay gear step is performed, and where after the shift control to the relay gear step ends, the downshift (third shift) to the targeted final gear step is performed. The engagement end determination regarding the relay gear step is made in a short time (second time), and therefore the dwell time in the relay gear step becomes short. Hence, the shift time needed until the target final gear step is established is shortened, and a desired driving power can be obtained as promptly as possible.

The invention is also effective in various power-off→on downshifts selected in connection with a change to the power-on state during a power-off shift due to a shift judgment in the power-off state, such as a multiplex shift in which, due to a change to the power-on state caused by an accelerator-on operation during a power-off downshift due to a shift judgment in the power-off state, a further downshift to a targeted gear step which does not use a relay gear step is performed, a power-off→on downshift caused merely by a change of the power state during the power-off downshift, a multiplex shift (including a shift to a relay gear step) in which, due to a change of the power-on state caused by an accelerator-on operation during the power-off upshift due to a shift judgment in the power-off state, etc. In such shifts, since the shift time is shortened, a desired driving power can be promptly obtained. Besides, if the shift time is thus shortened, other effects can be obtained; for example, a multiplex shift that may follow, including a shift that uses a relay gear step as mentioned above, is restrained, and the burden on the friction engagement devices is lightened, and durability will improve.

The engagement end determination is made, for example, by judging whether or not the input shaft rotation speed has continued to be within the range of the synchronous rotation speed of the post-shift gear step±a predetermined value $\alpha$ for a predetermined time. As for the predetermined value $\alpha$, it is desirable to set a smallest-possible value, taking into account the error of the rotation speed sensor, and the like. In the case where the determination is repeatedly performed at a predetermined cycle time, a number of times of determination may be set as the determination time (the first time, the second time).

The invention is suitably applied to the case where the fashion of the engagement/release control of the friction engagement devices differs depending on whether the shift is a simple power-on downshift or a power-off→on downshift, and includes power-on downshift shift control in which downshift is performed in such different control fashions. Specifically, at the time of the power-on state, the input shaft rotation speed rises on its own during the shift. Therefore, in an ordinary power-on downshift, the input shaft rotation speed is allowed to rise while the sharp rise in the input shaft rotation speed is restrained by the release-side oil pressure. When the input shaft rotation speed reaches the vicinity of or exceeds the synchronous rotation speed of the post-shift gear step, the engagement-side friction engagement device is engaged. Then, while it is being checked that the turbine rotation speed NT does not sharply rise, the release-side oil pressure is dropped. Thus the downshift is performed. At the time of the power-off state, the input shaft rotation speed does not rise on its own during the shift, there is a need to raise the input shaft rotation speed by the engagement-side oil pressure while early releasing the release-side friction engagement device. On the other hand, in the power-off→on downshift in which the power state changes to the power-on state halfway through the shift, the release-side friction engagement device is already released in the remaining-the-same shift whereas in the multiplex shift the state of engagement of the release-side friction engagement device is not known, and should desirably be promptly released. Therefore, in connection with the power-on state, the input shaft rotation speed promptly rises on its own, so that the downshift is performed while the sharp rise in the input shaft rotation speed is restrained by the engagement of the engagement-side friction engagement device, the torque-down control of the motive power source, etc.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments.

Figures 1, 2:
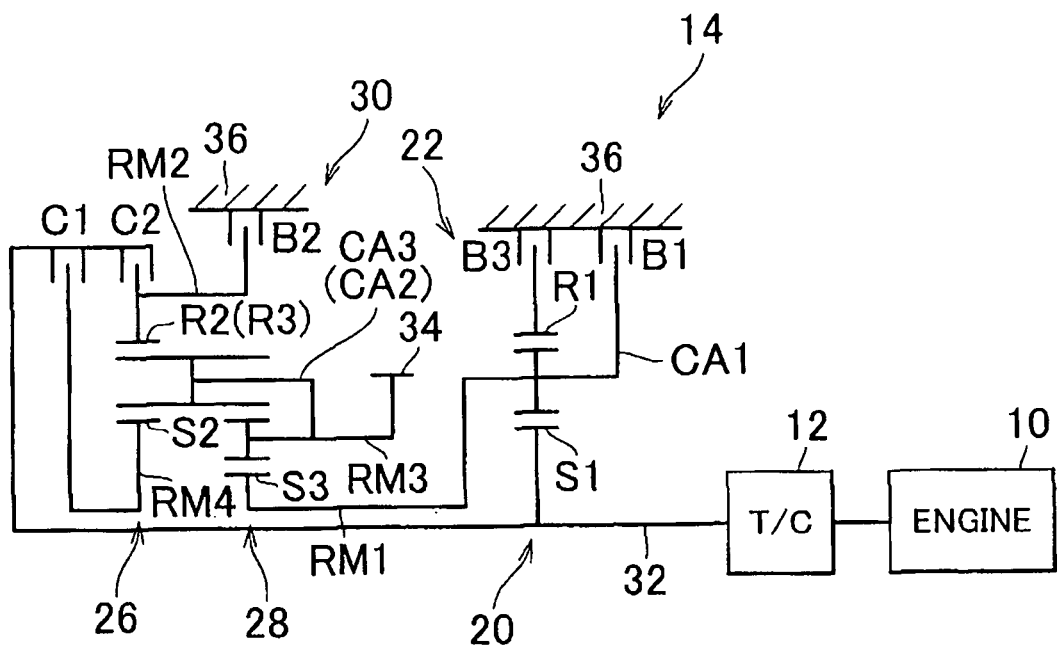
FIG. 1 is a skeleton diagram of a vehicular drive apparatus to which the invention is applied.
FIG. 2 is a diagram illustrating the engaged and released states of clutches and brakes for establishing various gear steps of an automatic transmission shown in FIG. 1.

FIG. 1 is a skeleton diagram of a transversely mounted type vehicular drive apparatus, such as an FF (front engine, front wheel drive) vehicle or the like, in which the output of an engine 10 constructed of an internal combustion engine, such as a gasoline engine or the like, is transferred to driving wheels (front wheels) via a torque converter 12, an automatic transmission 14, and a differential gear device (not shown). The engine 10 is a power source for running the vehicle, and the torque converter 12 is a coupling that employs a fluid.

The automatic transmission 14 has, on the same axis, a first speed change portion 22 constructed mainly of a single pinion-type first planetary gear device 20, and a second speed change portion 30 constructed mainly of a single pinion-type second planetary gear device 26 and a double pinion-type third planetary gear device 28. The automatic transmission 14 changes the rotation of an input shaft 32 in speed, and outputs it from an output gear 34. The input shaft 32 corresponds to an input member, and, in this embodiment, is a turbine shaft of a torque converter 12. The output gear 34 corresponds to an output member, and rotationally drives the left and right driving wheels via the differential gear device. Incidentally, the automatic transmission 14 is constructed substantially symmetrically about a center line. In FIG. 1, a half of the automatic transmission 14 below the center line is omitted.

The first planetary gear device 20 constituting the first speed change portion 22 has three rotating elements: a sun gear S1, a carrier CA1, and a ring gear R1. The sun gear S1 is coupled to the input shaft 32, and is rotationally driven thereby, and the ring gear R1 is unrotatably fixed to a case 36 via a third brake B3. In this manner, the carrier CA1 is rotated as an intermediate output member at reduced speed relative to the input shaft 32, and thus outputs reduced-speed rotation. The second planetary gear device 26 and the third planetary gear device 28 constituting the second speed change portion 30 are partly coupled to each other, and therefore have four rotating elements RM1 to RM4. Concretely, a sun gear S3 of the third planetary gear device 28 constitutes a first rotating element RM1. A ring gear R2 of the second planetary gear device 26 and a ring gear R3 of the third planetary gear device 28 are coupled to each other, and constitute a second rotating element RM2. A carrier CA2 of the second planetary gear device 26 and a carrier CA3 of the third planetary gear device 28 are coupled to each other, and constitute a third rotating element RM3. A sun gear S2 of the second planetary gear device 26 constitutes a fourth rotating element RM4. The second planetary gear device 26 and the third planetary gear device 28 are provided as a Ravigneaux type planetary gear train in which the carriers CA2 and CA3 are constructed by a common member, and the ring gears R2 and R3 are constructed by a common member, and pinion gears of the second planetary gear device 26 serve also as second pinion gears of the third planetary gear device 28.

The first rotating element RM1 (sun gear S3) is selectively coupled to the case 36 and therefore is stopped from rotating by a first brake B1. The second rotating element RM2 (ring gear R2, R3) is selectively coupled to the case 36 and therefore is stopped from rotating by a second brake B2. The fourth rotating element RM4 (sun gear S2) is selectively coupled to the input shaft 32 via a first clutch C1. The second rotating element RM2 (ring gear R2, R3) is selectively coupled to the input shaft 32 via a second clutch C2. The first rotating element RM1 (sun gear S3) is integrally coupled to the carrier CA1 of the first planetary gear device 20 which is the intermediate output member, and the third rotating element RM3 (carrier CA2, CA3) is integrally coupled to the output gear 34. In this manner, rotation is output from the output gear 34.

Each of the clutches C1, C2 and the brakes B1, B2, B3 (hereinafter, referred to simply as "clutch C" or "brake B" if not particularly distinguished) is a hydraulic friction engagement device, such as a multi-plate clutch, a band brake, etc., whose engagement is controlled by a hydraulic actuator. The clutches C1, C2 and the brakes B1, B2, B3 are switched between the engaged and released states as shown in FIG. 2 by a hydraulic circuit being switched through the excitation and deexcitation of linear solenoid valves SL1 to SL5 of a hydraulic control circuit 98 (see FIG. 3) or through the use of a manual valve (not shown). Thus, each of gear steps, that is, six forward-travel steps and one reverse-travel step, can be established in accordance with the operation position of a shift lever 72 (see FIG. 3). In FIG. 2, "1st" to "6th" mean the first to sixth speed forward-travel gear steps, and "Rev" means a reverse-travel gear step. The speed change ratios thereof (=input rotation speed NIN/output shaft rotation speed NOUT) are appropriately determined by the gear ratios $\rho 1$, $\rho 2$, $\rho 3$ of the first planetary gear device 20, the second planetary gear device 26 and the third planetary gear device 28. In FIG. 2, "○" means engagement, and blanks mean release.

Figure 4:
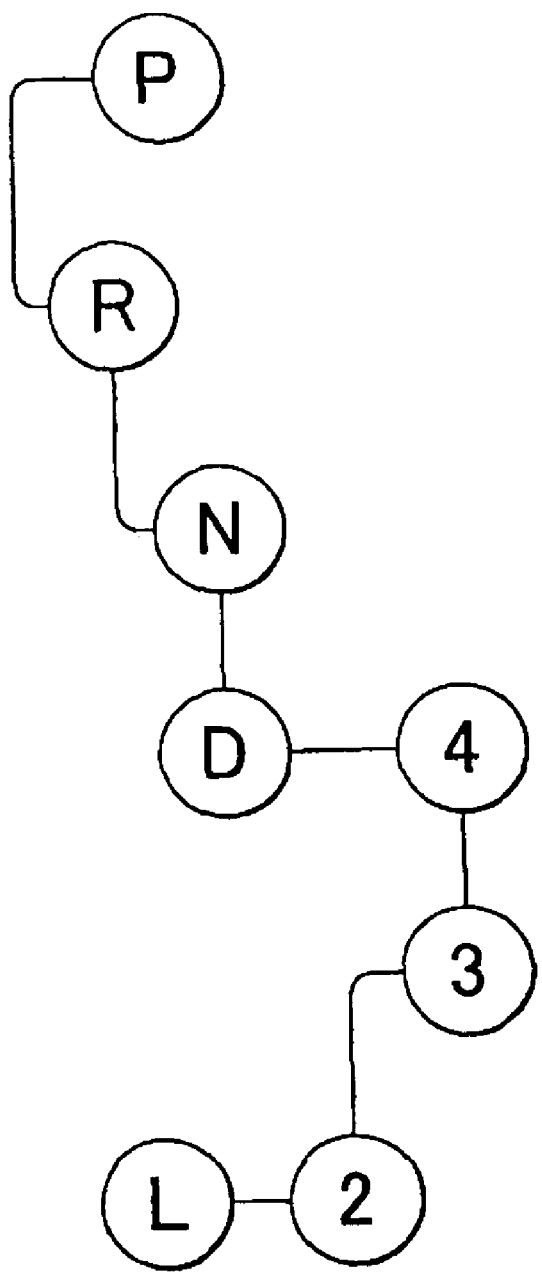
FIG. 4 is a diagram showing an example of a shift pattern of a shift lever shown in FIG. 3.

The shift lever 72 is designed to be operated, for example, to the parking position "P", the reverse drive position "R", the neutral position "N", and the forward drive positions "D", "4", "3", "2", "L" in accordance with the shift pattern shown in FIG. 4. At the "P" and 'N' positions, a neutral state where the power transfer is cut off is established. However, at the "P" position, rotation of the driving wheels is mechanically prevented by a mechanical parking mechanism (not shown).

Figure 3:
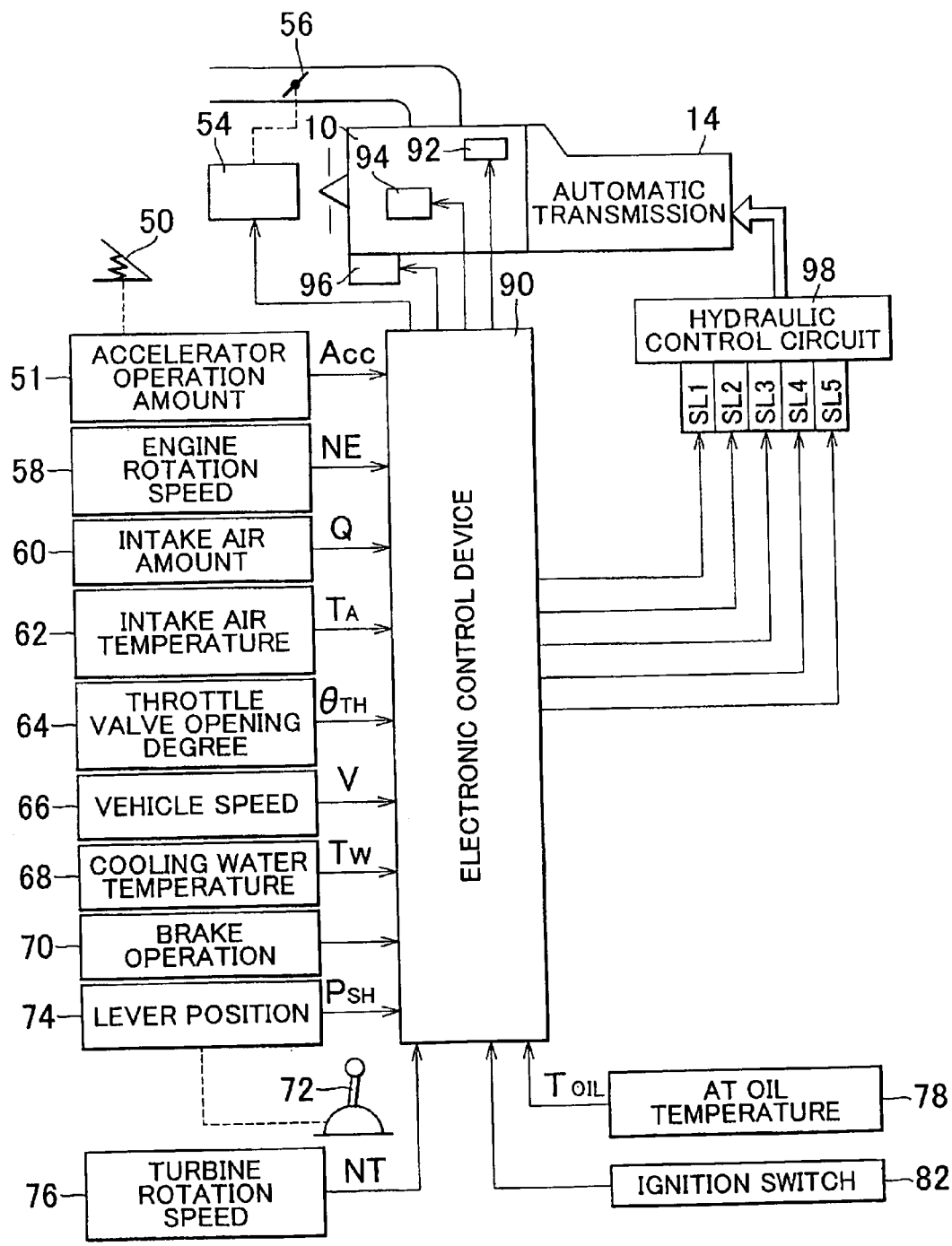
FIG. 3 is a diagram illustrating input/output signals with respect to an electronic control device provided in a vehicle of the embodiment shown in FIG. 1.

FIG. 3 is a block diagram illustrating a control system that is provided in a vehicle for controlling the engine 10 and the automatic transmission 14 shown in FIG. 1, and the like. In this control system, the amount of operation of an accelerator pedal 50 (accelerator operation amount) Acc is detected by an accelerator operation amount sensor 51. The accelerator pedal 50 is depressed to extents that are in accordance with the driver's output requirements. The accelerator pedal 50 corresponds to an accelerator-operating member, and the accelerator operation amount Acc corresponds to the output requirement. An intake piping of the engine 10 is provided with an electronic throttle valve 56 whose degree of opening $\theta_{TH}$ is changed by a throttle actuator 54. Further provided are an engine rotation speed sensor 58 for detecting the rotation speed NE of the engine 10, an intake air amount sensor 60 for detecting the intake air amount Q of the engine 10, an intake air temperature sensor 62 for detecting the temperature TA of intake air, an idle switch-equipped throttle sensor 64 for detecting the fully closed state (idle state) of the electronic throttle valve 56 and the degree of opening $\theta_{TH}$ thereof, a vehicle speed sensor 66 for detecting the rotation speed of the output gear 34 (corresponding to the output shaft rotation speed) NOUT that corresponds to the vehicle speed V, a cooling water temperature sensor 68 for detecting the cooling water temperature TW of the engine 10, a brake switch 70 for detecting the presence/absence of foot brake operation, a lever position sensor 74 for detecting the lever position (operation position) PSH of the shift lever 72, a turbine rotation speed sensor 76 for detecting the turbine rotation speed NT, an AT oil temperature sensor 78 for detecting the AT oil temperature TOIL that is the temperature of the working oil within the hydraulic control circuit 98, an ignition switch 82, etc. From these sensors, signals representing the engine rotation speed NE, the intake air amount Q, the intake air temperature TA, the throttle valve opening degree $\theta_{TH}$, the vehicle speed V (output shaft rotation speed NOUT), the engine cooling water temperature TW, the presence/absence of brake operation, the lever position PSH of the shift lever 72, the turbine rotation speed NT, the AT oil temperature TOIL, the operation position of the ignition switch 82, etc. are supplied to an electronic control device 90. The turbine rotation speed NT is the same as the rotation speed (input shaft rotation speed NIN) of the input shaft 32 that is an input member.

Figure 5:
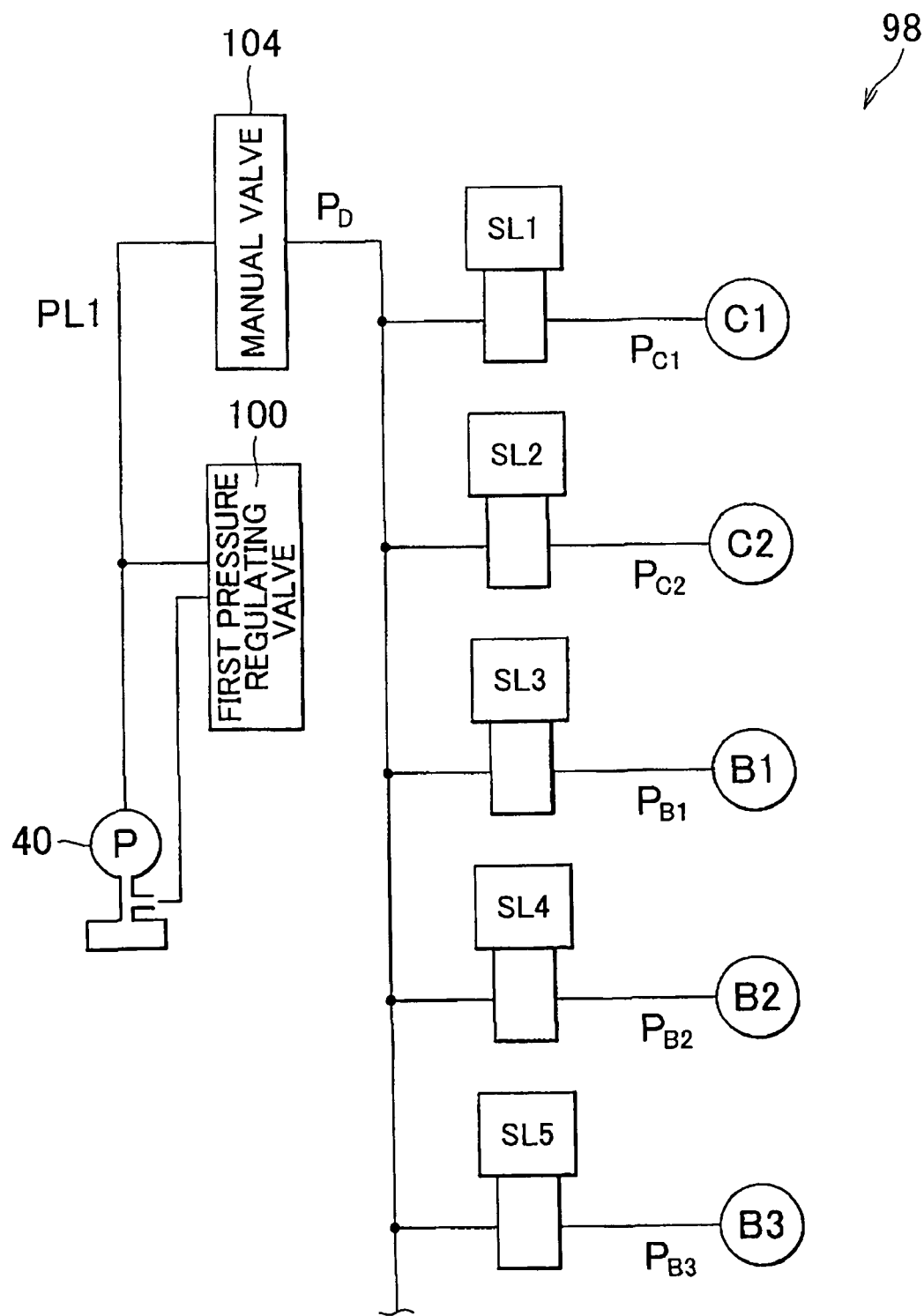
FIG. 5 is a circuit diagram illustrating the construction of a portion of a hydraulic control circuit shown in FIG. 3 which is related to the shift control of the automatic transmission.

The hydraulic control circuit 98 includes a circuit shown in FIG. 5, in connection with the shift control of the automatic transmission 14. In FIG. 5, the working oil that is pressure-fed from an oil pump 40 is regulated in pressure by a relief-type first pressure regulator valve 100 so as to become a first line pressure PL1. The oil pump 40 is a mechanical pump that is rotationally driven by the engine 10. The first pressure regulating valve 100 regulates the first line pressure PL1 in accordance with the turbine torque TT, that is, the input torque TIN of the automatic transmission 14, or its substitute value, that is, the throttle valve opening degree $\theta_{TH}$. The first line pressure PL1 is supplied to a manual valve 104 that is operated in association with the shift lever 72. Then, if the shift lever 72 is at a forward travel drive position such as the "D" position or the like, a forward travel position pressure PD equal in magnitude to the first line pressure PL1 is supplied from the manual valve 104 to the linear solenoid valves SL1 to SL5. The linear solenoid valves SL1 to SL5 are provided corresponding to the clutches C1, C2 and the brakes B1 to B3, respectively. The states of excitation of the linear solenoid valves SL1 to SL5 are controlled in accordance with drive signals output by the electronic control device 90, and therefore, the engagement oil pressures PC1, PC2, PB1, PB2, PB3 of the clutches C1, C2 and the brakes B1 to B3 are controlled independently of each other. Thus, any one of the first speed gear step "1st" to the sixth speed gear step "6th" can be selectively established. Each of the linear solenoid valves SL1 to SL5 is of a large-capacity type, and the output oil pressure thereof is directly supplied to a corresponding one of the clutches C1, C2 and the brakes B1 to B3. Thus, a direct pressure control of directly controlling the engagement oil pressures PC1, PC2, PB1, PB2, PB3 is performed.

Figure 6:
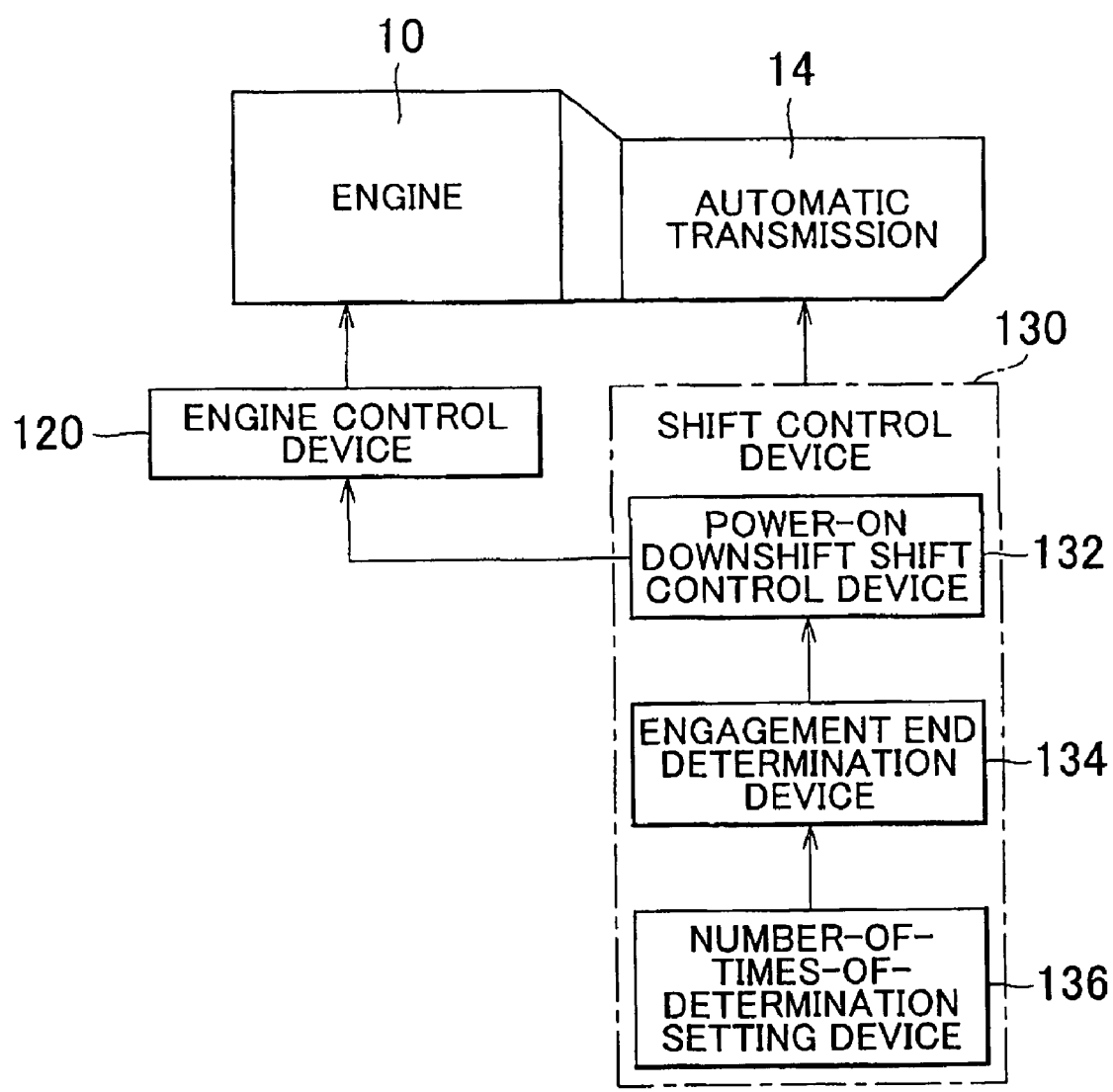
FIG. 6 is a block diagram illustrating functions that the electronic control device of FIG. 3 has.

The electronic control device 90 includes a so-called microcomputer that includes a CPU, a RAM, a ROM, an input/output interface, etc. The CPU executes various functions of an engine control device 120 and a shift control device 130 as shown in FIG. 6 by performing signal processing in accordance with programs pre-stored in the ROM while utilizing the temporary storage function of the RAM. The electronic control device 90 is constructed so as to have separate portions for engine control and shift control if necessary.

Figure 7:
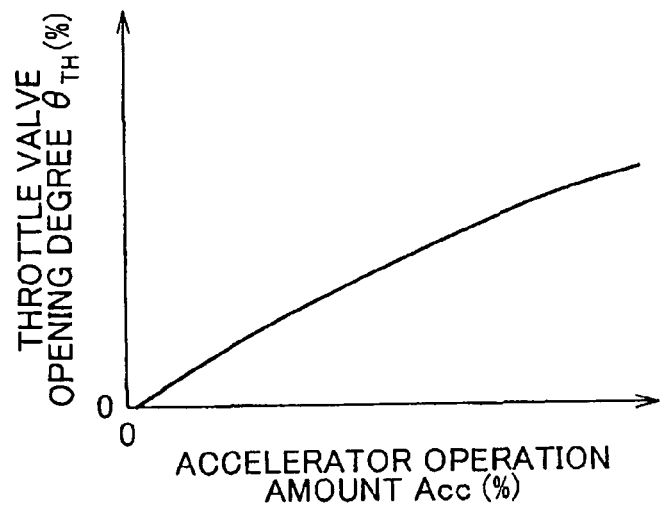
FIG. 7 is a diagram showing an example of a relationship between the accelerator operation amount Acc and the throttle valve opening degree $\theta_{TH}$ which is used in a throttle control performed by an engine control device shown in FIG. 6.

The engine control device 120 performs the output control of the engine 10. That is, the engine control device 120 controls the opening and closing of the electronic throttle valve 56 via the throttle actuator 54, and controls the fuel injection valve 92 (see FIG. 3) for the fuel injection amount control, and controls an ignition device 94, such as an igniter or the liker, for the ignition timing control. As for the control of the electronic throttle valve 56, for example, the throttle actuator 54 is driven on the basis of the actual accelerator operation amount Acc from a relationship shown in FIG. 7, and the throttle valve opening degree $\theta_{TH}$ is increased with increases in the accelerator operation amount Acc. Besides, at the time of starting the engine 10, cranking is performed by a starter (electric motor) 96.

Figure 8:
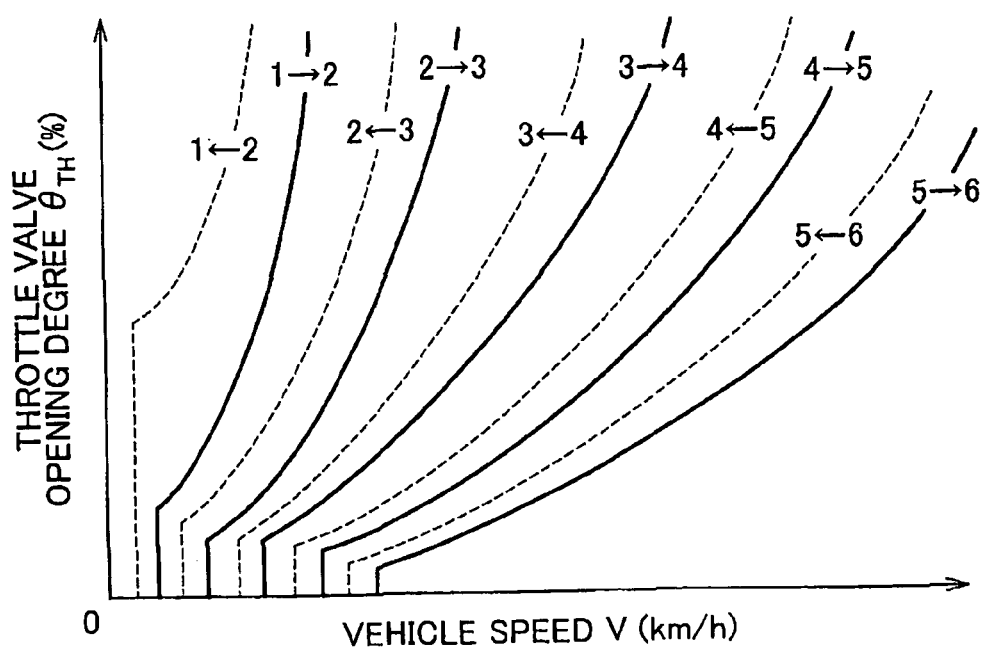
FIG. 8 is a diagram showing an example of a shift graph (map) used in the shift control of the automatic transmission performed by a shift control device shown in FIG. 6.

The shift control device 130 performs the shift control of the automatic transmission 14. For example, on the basis of the actual throttle valve opening degree $\theta_{TH}$ and the vehicle speed V from a pre-stored shift chart (shift map) shown in FIG. 8, a gear step to which the automatic transmission 14 (i.e., a post-shift gear step) needs to shift is determined, that is, judgment regarding a shift from the present gear step to a shift-target gear step is executed, and a shift output for starting a shift action for the determined gear step is accomplished, and the states of excitation of the linear solenoid valves SL1 to SL5 of the hydraulic control circuit 98 are continuously changed so that a shift shock, such as a driving power change or the like, will not occur and the durability of a friction member of the clutches C or the brakes B will not degrade. As is apparent from FIG. 2, the automatic transmission 14 of this embodiment is designed to perform the shift between consecutive gear steps by a clutch-to-clutch shift in which one of the clutches C and the brakes B is released and another one of them is engaged. In FIG. 8, solid lines are upshift lines, and broken lines are downshift lines. As the vehicle speed V becomes lower, or as the throttle valve opening degree $\theta_{TH}$ becomes larger, the gear step is switched to a lower-speed side gear step that has a larger speed change ratio. In FIG. 8, numerals "1" to "6" mean the first speed gear step "1st" to the sixth speed gear step "6th", respectively.

When the shift lever 72 is operated to the "D" position, a most significant D range (automatic shift mode) in which shifting is automatically performed among all the forward travel gear steps "1st" to "6th". If the shift lever 72 is operated to one of the "4" to "L" positions, a corresponding one of 4, 3, 2 and L shift range is established. In the 4 range, the shift control is performed among the fourth speed gear step "4th" and the lower forward travel gear steps. In the 3 range, the shift control is performed among the third speed gear step "3rd" and the lower forward travel gear steps. In the second range, the shift control is performed among the second sped gear step "2nd" and the lower forward travel gear step. In the L range, the gear step is fixed to the first speed gear step "1st". Therefore, for example, if during a run with the sixth speed gear step "6th" in the D range, the shift lever 72 is operated from the "D" position to the "4" position, the "3" position, and then the "2" position, the shift range is switched in the sequence of D→4→3→2, with the gear step being compulsorily shifted down from the sixth speed gear step "6th" to the fourth speed gear step "4th", the third speed gear step "3rd", and then the second speed gear step "2nd". Thus, the gear step can be altered through manual operations.

The shift control of the automatic transmission 14 on an automatic or manual basis as described above is performed by changing the engagement-side oil pressure and/or the release-side oil pressure in accordance with a change pattern determined beforehand or changing the engagement-side oil pressure and/or the release-side oil pressure at predetermined change timing. The fashion of controlling the change pattern, the change timing, etc. is determined in accordance with the fashion of shift, such as an upshift or a downshift, a power-on state or a power-off state, or a multiplex shift or a single shift, etc., through synthetical consideration of the durability and the shift responsiveness of the clutches C and the brakes B, the shift shock, etc.

In FIG. 6, a power-on downshift shift control device 132 provided in the shift control device 130 relates to a hydraulic control of release-side and engagement-side friction engagement devices (clutches C and/or brakes B) at the time of a power-on downshift. The power-on downshift shift control device 132 is designed separately for the case of a simple power-on downshift due to a shift judgment in the power-on state, and the case of a power-off→on downshift in which during a power-off downshift due to a shift judgment in the power-off state, the power-on state is caused by an accelerator-on operation (a depressing operation of the accelerator pedal 50). The power-off→on downshift includes (i) a multiplex shift to a relay gear step, (ii) a multiplex shift that does not use a relay gear step, and (iii) a single shift caused merely by a change of the power state.

As for the power-on downshift, the turbine rotation speed NT rises on its own during the shift. Therefore, the turbine rotation speed NT is allowed to rise while the sharp rise in the turbine rotation speed NT is restrained by the release-side oil pressure. When the turbine rotation speed NT reaches the vicinity of or exceeds the synchronous rotation speed of the post-shift gear step, the engagement-side friction engagement device is engaged. Then, while it is being checked that the turbine rotation speed NT does not sharply rise, the release-side oil pressure is dropped. Thus the downshift is performed. For example, the 4→2 downshift in FIG. 10 is a downshift from the fourth-speed gear step "4th", which is a relay gear step, to the second-speed gear step "2nd", and is a simple power-on downshift since the 4→2 downshift is performed after the shift to the fourth-speed gear step "4th" has completely ended.

Figure 10:
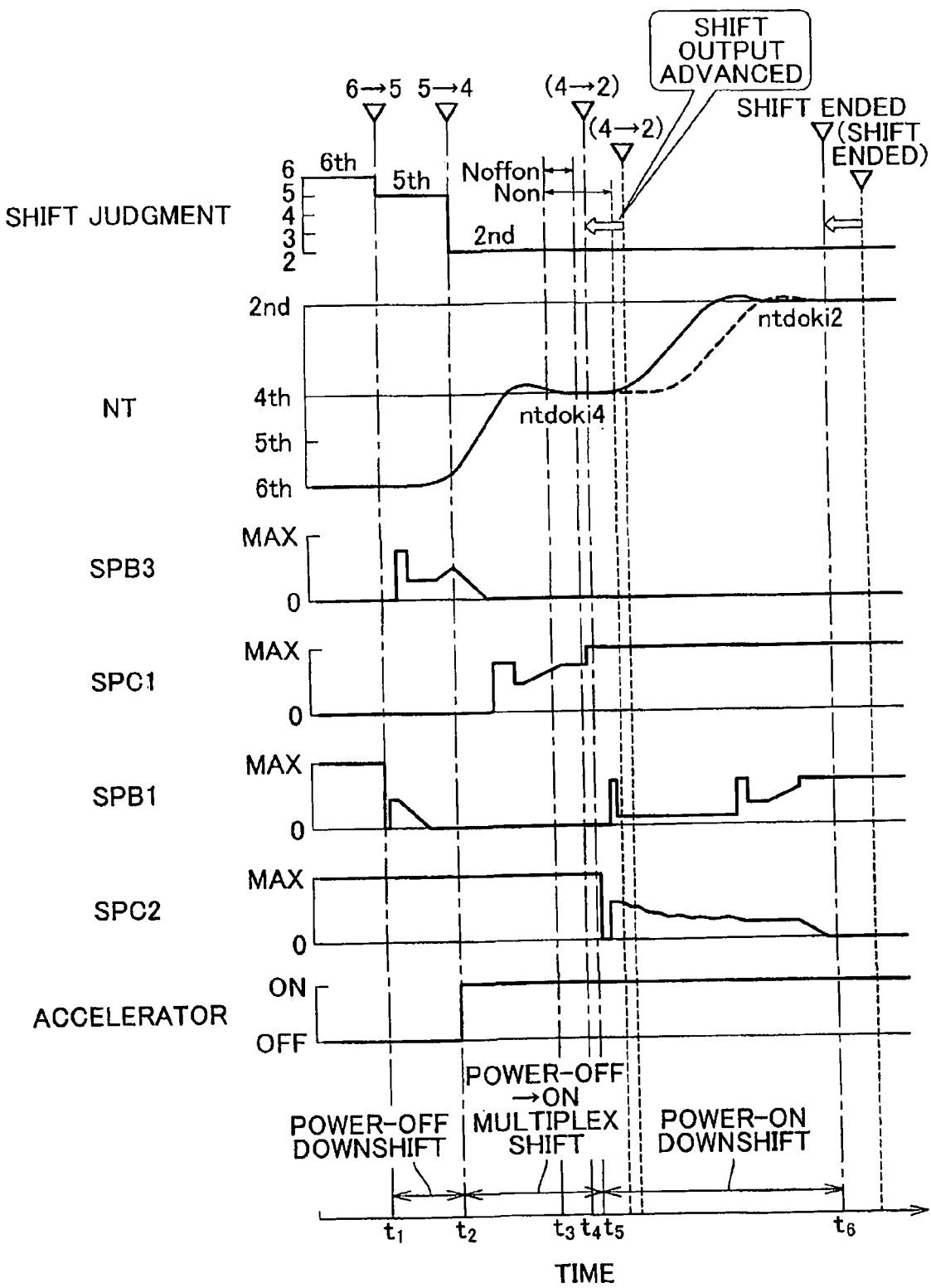
FIG. 10 is an example of a time chart of a case where during the power-off 6→5 downshift, the power state changes to the power-on state, and a temporary shift to the fourth-speed gear step is followed by a further shift to the targeted second-speed gear step, and where the engagement end determination regarding the 5→4 downshift is performed in accordance with the flowchart of FIG. 9.

The indications of "2nd", "4th", "5th" and "6th" on the vertical axis in the section of the turbine rotation speed NT in FIG. 10 represent the synchronous rotation speeds of those gear steps, and are each found by multiplying the vehicle speed, that is, the output shaft rotation speed NOUT, and the speed change ratio of the gear step. The turbine rotation speed NT being equal to the synchronous rotation speed of a gear step means the establishment of the gear step, and the turbine rotation speed NT being an intermediate value between the synchronous rotation speeds of gear steps means a shift operation being in progress. Besides, oil pressure designation values SPB3, SPC1, SPB1, SPC2 correspond to the oil pressure PB3 of the third brake B3, the oil pressure PC1 of the first clutch C1, the oil pressure PB1 of the first brake B1, and the oil pressure PC2 of the second clutch C2, respectively, and correspond to the exciting currents for the linear solenoid valves SL5, SL1, SL3, SL2 that control the oil pressures of the friction engagement devices. The actual oil pressures PB3, PC1, PB1, PC2 change with a delay from the oil pressure designation values SPB3, SPC1, SPB1, SPC2, respectively, and in a moderated form.

In FIG. 10, time t5 is a time at which a 4→2 downshift command is output. In association with the command, the second clutch C2, which is the release-side friction engagement device, is controlled for release, and the first brake B1, which is the engagement-side friction engagement device, is controlled for engagement at a predetermined timing. Concretely, in the power-on downshift, since the turbine rotation speed NT rises on its own, the oil pressure designation value SPC2 of the second clutch C2 is gradually dropped so that the turbine rotation speed NT rises at a predetermined gradient. When the turbine rotation speed NT reaches the vicinity of or exceeds the synchronous rotation speed ntdoki2 of the second-speed gear step "2nd", which is the post-shift gear step, the oil pressure designation value SPB1 is raised to engage the first brake B1. At the same time, while it is being checked that the turbine rotation speed NT does not sharply rise, the oil pressure designation value SPC2 is dropped to release the second clutch C2.

Next, the hydraulic controls of the three fashions of power-off→on downshifts will be described.

(i) Multiplex Shift to Relay Gear Step

The multiplex shift to a relay gear step is a downshift to a relay gear step which is performed in the case where during a power-off downshift (first shift), the power state changes to the power-on state due to an accelerator-on operation, and therefore a judgment for the downshift to a gear step that is lower than the gear step that needs the engagement switch between input clutches (clutches C1, C2 in the automatic transmission 14), and where a multiplex shift (second shift) of temporary downshift to an intermediate relay gear step is performed, and where after the shift control to the relay gear step ends, the downshift (third shift) to the targeted final gear step is performed. The time chart of FIG. 10 shows an example thereof in which during the power-off 6→5 downshift (first shift), the 5→2 downshift judgment is made due to an accelerator-on operation. In this case, since it is necessary to switch the states of engagement of four clutches C and brakes B, the fourth-speed gear step "4th" is set as a relay gear step, so as to first perform a 5→4 downshift (second shift). After the shift to the fourth-speed gear step "4th" ends, a 4→2 downshift (third shift) is performed to accomplish the downshift to the targeted second-speed gear step "2nd". In this operation, the 5→4 downshift (second shift) is a power-off→on downshift.

In this case, at time t2 when the 5→4 downshift command is output, the state of engagement of the third brake B3 operated as the release-side friction engagement device is not distinct, and therefore the oil pressure designation value SPB3 is promptly dropped at a predetermined gradient so as to immediately release the third brake B3. Then, when the third brake B3, which is currently the release-side friction engagement device, is released, the turbine rotation speed NT promptly rises on its own as the output of the engine 10 increases. When the turbine rotation speed NT reaches the vicinity of the synchronous rotation speed ntdoki4 of the fourth-speed gear step "4th", which is currently the post-shift gear step, the downshift is performed while the sharp rise in rotation speed is being restrained by the engagement control of the first clutch C1 (control of the oil pressure designation value SPC1), which is currently the engagement-side friction engagement device. In that case, a torque-down control, such as a control of reducing the opening of the electronic throttle valve 56 of the engine 10, or the like, is performed as well, in order to prevent shift shock, or excessive sharp rise in rotation speed.

(ii) Multiplex Shift that Does Not Use Relay Gear Step

The multiplex shift that does not use a relay gear step is a multiplex shift in which the state changes to the power-on state due to an accelerator-on operation during a power-off downshift (first shift) based on the shift judgment in the power-off state, and therefore a further downshift (second shift) to a targeted gear step is performed without using a relay gear step. An example of this multiplex shift is shown in FIG. 10, in which during the power-off 6→5 downshift (first shift), the state changes to the power-on state and a 5→4 downshift judgment is made, and therefore the 5→4 downshift (second shift) is immediately performed. In this case, substantially the same shift control is performed as in the case where the 5→4 downshift is performed as a downshift to a relay gear step (FIG. 10).

(iii) Single Shift Caused Merely by Change of Power State

The single shift caused merely by a change of the power state is a power-off→on downshift that is caused merely by the change to the power-on state during a power-off downshift. An example thereof is a 6→5 downshift shown in FIG. 11, in which during a power-off 6→5 downshift, the power state changes to the power-on state due to an accelerator-on operation at time t2. When a power-off 6→5 downshift command is output at time t1, the oil pressure designation value SPB1 of the first brake B1, which is currently the release-side friction engagement device, is relatively promptly dropped so that the first brake B1 is released. Therefore, when the turbine rotation speed NT rises in connection with a power-off→on state change, the first brake B1 cannot be used to restrain the sharp rise in the turbine rotation speed NT. Therefore, the sharp rise in the turbine rotation speed NT is restrained by the engagement control of the engagement-side friction engagement device, which is currently the third brake B3, (control of the oil pressure designation value SPB3), while the downshift is performed, similarly to the power-on 5→4 downshift in FIG. 10. In that case, the torque-down control, such as a control of reducing the opening of the electronic throttle valve 56 of the engine 10, or the like, is performed as well, in order to prevent shift shock, or excessive sharp rise in rotation speed.

Figure 9:
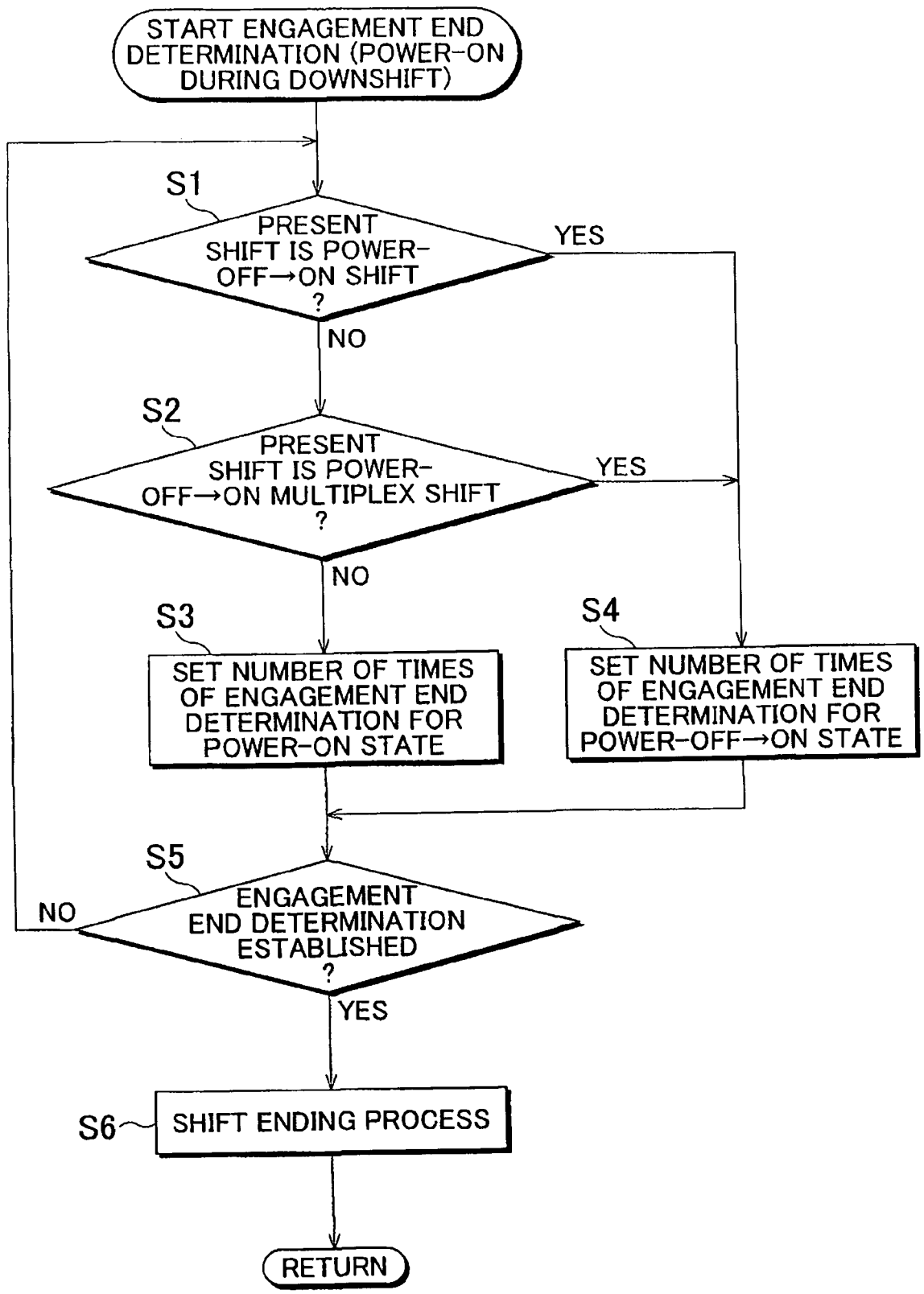
FIG. 9 is a flowchart that concretely illustrates the content of processes of an engagement end determination device and a number-of-times-of-determination setting device.

Referring back to FIG. 6, the shift control device 130 also makes an engagement end determination depending on whether or not the turbine rotation speed NT has been continuously held in the vicinity of the synchronous rotation speed of the post-shift gear step for a predetermined time, in relation to the power-on downshift shift control device 132, and therefore includes an engagement end determination device 134 and a number-of-times-of-determination setting device 136, whereby signal processing is performed in accordance with a flowchart shown in FIG. 9.

The process shown in FIG. 9 is executed when a downshift is being executed and the power state is the power-on state brought about by a depressing operation of the accelerator pedal 50, that is, when the idle switch is off and, substantially, the shift control by the power-on downshift shift control device 132 is being executed. In step S1, it is judged whether or not the present shift is a power-off→on shift, in other words, whether or not the present shift is an aforementioned (iii) single shift caused merely by a change of the power state. If the shift is a power-off→on shift, a number of times of engagement end determination Noffon for the power-off→on state is set in step S4. If the judgment in step S1 is NO (negative), then step S2 is executed. In step S2, it is judged whether or not the present shift is a power-off→on multiplex shift, in other words, whether or not the present shift is one of an aforementioned (i) multiplex shift to a relay gear step and an aforementioned (ii) multiplex shift that does not use a relay gear step. Then, if the present shift is such a power-off→on multiplex shift, a number of times of engagement end determination Noffon for the power-off→on state is set in step S4 as in the above-described case. Incidentally, the distinction between step S1 and step S2 may be omitted, that is, it may be judged whether or not the present shift is a power-off→on shift, including a multiplex shift, before step S4 is executed.

The number of times of engagement end determination Noffon is the number of times that an engagement end determination condition has been successively satisfied in step S5 for engagement end determination while step S5 has been repeatedly executed at a predetermined cycle time. The number of times of engagement end determination Noffon substantially corresponds to the continuation time of the satisfaction of the engagement end determination condition, and is also termed second time. Herein, in any one of the (i) multiplex shift to a relay gear step, the (ii) multiplex shift that does not use a relay gear step, and the (iii) single shift caused merely by a change of the power state, the downshift is performed while the sharp rise in the turbine rotation speed NT is restrained by the engagement control of the engagement-side friction engagement device or the torque-down control of the engine 10. Therefore, there is no possibility of the dwell of the turbine rotation speed NT in the vicinity of the synchronous rotation speed of the post-shift gear step being due to the release-side oil pressure, and it can be judged that the dwell of the turbine rotation speed NT is due to the engagement of the engagement-side friction engagement device. Hence, the engagement end determination can be performed in a relatively short time, and the number of times of engagement end determination Noffon is also set at a relatively small value. As for the number of times of engagement end determination Noffon, a constant value may be determined; however, in this embodiment, values vary in accordance with the kinds of shifts which indicate from which gear step to which gear step a shift is.

In the case where both the judgment in step S1 and the judgment in step S2 are NO (negative), that is, in the case of a power-on downshift due to a downshift judgment made in a power-on state, a number of times of engagement end determination Non for the power-on state is set in step S3. The number of times of engagement end determination Non, similar to the number of times of engagement end determination Noffon, is the number of times that an engagement end determination condition has been successively satisfied in step S5 for engagement end determination while step S5 has been repeatedly executed at a predetermined cycle time. The number of times of engagement end determination Non substantially corresponds to the continuation time of the satisfaction of the engagement end determination condition, and is also termed first time. As for the power-on downshift based on a downshift judgment made in the power-on state, the turbine rotation speed NT is raised while the sharp rise in the turbine rotation speed NT is restrained by the release-side oil pressure. When the turbine rotation speed NT reaches the vicinity of or exceeds the synchronous rotation speed of the post-shift gear step, the engagement-side friction engagement device is engaged. Then, while it is being checked that the turbine rotation speed NT does not sharply rise, the release-side oil pressure is dropped. Thus the downshift is performed. As described above, since it is not distinct whether the dwell of the turbine rotation speed NT in the vicinity of the synchronous rotation speed of the post-shift gear step is due to the release-side oil pressure or due to the engagement-side oil pressure, it is necessary to drop the release-side oil pressure while checking that the turbine rotation speed NT is kept in the vicinity of the synchronous rotation speed. Therefore, a relatively long time is needed for the engagement end determination, and the number of times of engagement end determination Non is set at a greater value than the number of times of engagement end determination Noffon. As for the number of times of engagement end determination Non, a constant value may be determined; however, in this embodiment, values that indicate from which gear step to which gear step a shift is and that vary in accordance with the kinds of shifts are set.

In step S5, it is judged whether or not the turbine rotation speed NT satisfies an engagement end determination condition expressed by the following expression (I). Until an engagement end determination is made in step S5, step S1 and the subsequent steps are repeatedly executed at a predetermined cycle time, so that it is repeatedly judged whether or not the turbine rotation speed NT satisfies the engagement end determination condition of the expression (1). Furthermore in step S5, the number of times that the engagement end determination condition of the expression (1) has been successively satisfied is counted up. When the counted number of times reaches the number of times of engagement end determination Non or Noffon set in step S3 or S4, the engagement end determination that the engagement-side friction engagement device has been engaged is made. In the expression (1), ntdoki represents the synchronous rotation speed of the post-shift gear step, and $\alpha$ is a constant determined on the basis of the detection error of the turbine rotation speed sensor 76 and the like. Using the expression (1), it is judged whether or not the turbine rotation speed NT is substantially kept at the synchronous rotation speed ntdoki.

$$ntdoki + \alpha \geq NT \geq ntdoki - \alpha \tag{1}$$

After the engagement end determination is made in step S5, a shift ending process is executed in step S6. That is, in step S6, the engagement-side oil pressure is raised to the maximum value MAX and, in accordance with need, the torque-down control at the time of shifting performed regarding the engine 10 or the like is ended. The solid lines in FIG. 10 show a case where the number of times of engagement end determination Noffon for the power-off→on state is set in step S4 during the 5→4 downshift caused by a power-off→on operation, and where the engagement end determination is made at time t4 on the basis of the number of times of engagement end determination Noffon. In FIG. 10, the time t3 to t4 is a time during which the expression (1) is satisfied, and corresponds to the number of times of engagement end determination Noffon. Then, at time t5 subsequent to the execution of the shift ending process in connection with the engagement end determination, a 4→2 downshift command for the targeted second-speed gear step "2nd" is output, so that the 4→2 downshift starts. If in that case, the power-off→on downshift (including the multiplex shift) and the simple power-on downshift are not distinguished but are indiscriminately taken as a power-on downshift and, therefore, the number of times of engagement end determination Non is universally used for the engagement end determination, the 4→2 downshift command is delayed (see the parenthesized 4→2 in FIG. 10) by a time that corresponds to the difference (Non-Noffon) between the number of times of engagement end determination Non and the number of times of engagement end determination Noffon. The change of the turbine rotation speed NT is also delayed as shown by a broken line. Thus, if the number of times of engagement end determination Noffon is not employed, the final shift end time becomes later than the shift end time t6 in the foregoing embodiment.

Figure 11:
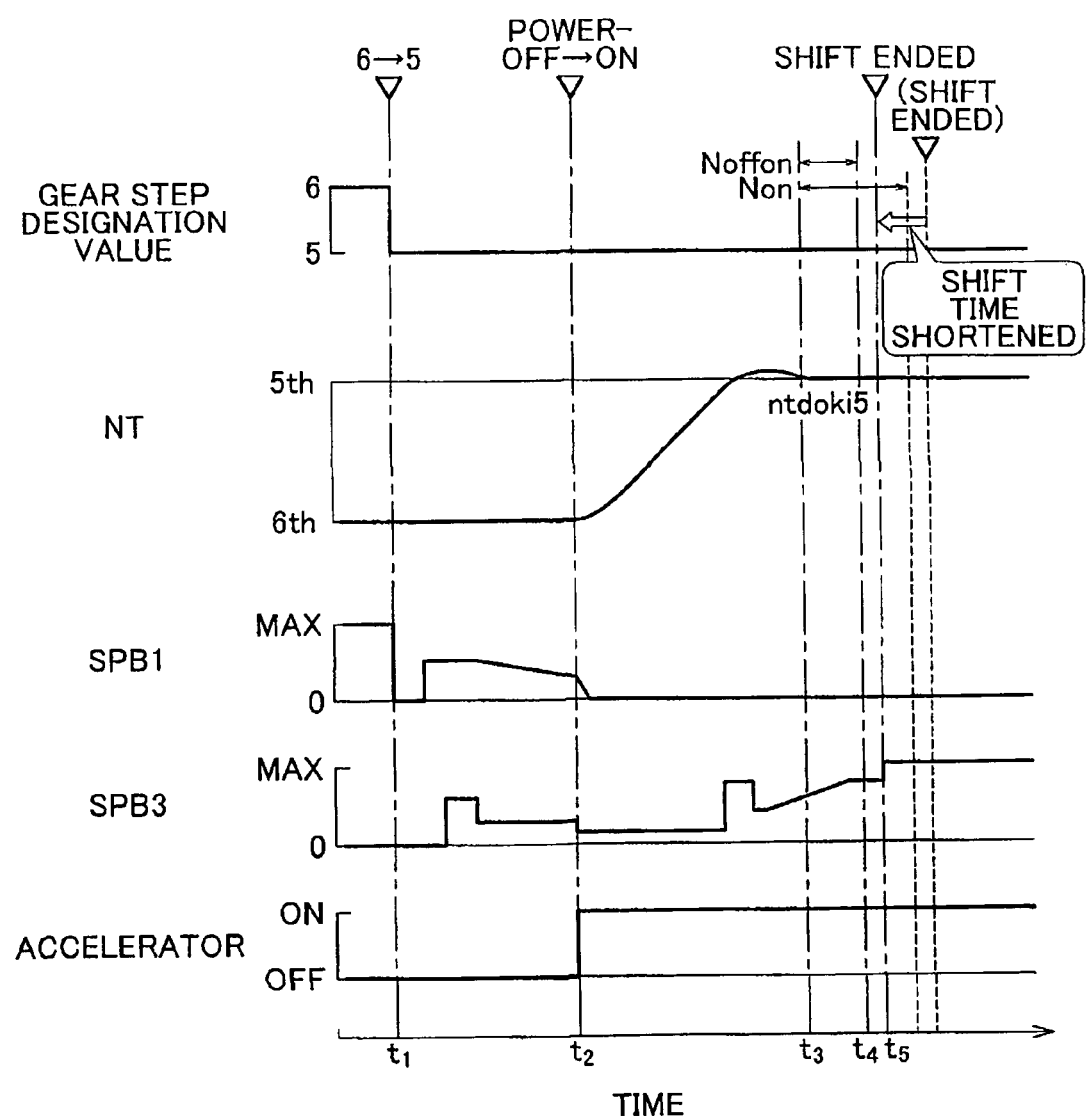
FIG. 11 is an example of a time chart of a case where during the power-off 6→5 downshift, the power state changes to the power-on state, but the 6→5 downshift is continued, and where the engagement end determination is performed in accordance with the flowchart of FIG. 9.

Similarly, in the power-off→on 6→5 downshift shown in FIG. 11, the number of times of engagement end determination Noffon for the power-off→on state is set in step S4, and the engagement end determination is made on the basis of the number of times of engagement end determination Noffon. Therefore, the engagement end determination time t4 is advanced by a time that corresponds to the difference (Non-Noffon) between the number of times of engagement end determination Noffon and the number of times of engagement end determination Non, and the shift end time t5 becomes correspondingly earlier.

Thus, according to the shift control device of this embodiment, in the case of a power-off→on downshift (including a multiplex shift) selected in connection with a change to the power-on state during a power-off downshift, the number of times of engagement end determination Noffon which is less than the number of times of engagement end determination Non used in the case of a simple power-on downshift that is performed in the power-on state from the beginning is set from the beginning for use in the engagement end determination in step S5. Therefore, the shift time can be shortened while a false determination in the engagement end determination is prevented. Thus, it becomes possible to promptly obtain a desired driving power and restrain the incidence of causing an uncomfortable feeling to the driver. In particular, in the downshift to the fourth-speed gear step "4th" as a relay gear step as shown in FIG. 10, the use of the number of times of engagement end determination Noffon as a basis for the engagement end determination causes the 4→2 downshift command to be output earlier by a time that corresponds to the difference (Non-Noffon) between the number of times of engagement end determination Noffon and the number of times of engagement end determination Non. Thus, the dwell time at the fourth-speed gear step "4th" as a relay gear step is shortened, and the second-speed gear step "2nd" is established correspondingly earlier. In this manner, excellent acceleration response will be obtained.

Besides, if the shift time is thus shortened, other effects can be obtained; for example, a multiplex shift that may follow is restrained, and the burden on the friction engagement devices is lightened, and durability will improve.

While the embodiment of the invention has been described in detail above with reference to the drawings, this is a mere embodiment, and the invention can be carried out in various manners with modifications and improvements based on the knowledge of those with ordinary skill in the art.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A shift control device of a vehicular automatic transmission that establishes a plurality of gear steps of different speed change ratios by selectively engaging a plurality of friction engagement devices, comprising:
    a first controller that performs a shift control for causing execution of a downshift through engagement switch between a release-side friction engagement device and an engagement-side friction engagement device; and
    a second controller that ends the shift control by making an engagement end determination regarding the engagement-side friction engagement device if it has been determined for a predetermined time that an input shaft rotation speed of the automatic transmission is in a vicinity of a synchronous rotation speed of a post-shift gear step,
    wherein the second controller sets the predetermined time at a first time if the downshift is a power-on downshift due to a shift judgment in a power-on state, and
    wherein the second controller sets the predetermined time at a second time that is shorter than the first time if the downshift is a power-off→on downshift selected in connection with a change to the power-on state during a power-off shift due to the shift judgment in a power-off state.

2. The shift control device of the vehicular automatic transmission according to claim 1, wherein the second controller sets each of the first time and the second time at a constant time.

3. The shift control device of the vehicular automatic transmission according to claim 1, wherein the second controller sets each of the first time and the second time in accordance with a kind of shift.

4. The shift control device of the vehicular automatic transmission according to claim 1, wherein the second controller sets each of the first time and the second time in accordance with a kind of a friction engagement device involved in a shift.

5. The shift control device of the vehicular automatic transmission according to claim 1, wherein the second controller sets each of the first time and the second time in accordance with at least one of a vehicle speed, an engine rotation speed, the input shaft rotation speed, and a working oil temperature.

6. The shift control device of the vehicular automatic transmission according to claim 1, wherein the second controller sets the second time at a time that varies depending on whether a shift is a multiplex shift to a relay gear step, or a multiplex shift that does not use a relay gear step, or a single shift caused merely by a change to the power-on state.

7. A shift control method of a vehicular automatic transmission that establishes a plurality of gear steps of different speed change ratios by selectively engaging a plurality of friction engagement devices, comprising:
    performing a shift control for causing execution of a downshift through engagement switch between a release-side friction engagement device and an engagement-side friction engagement device;
    ending the shift control by making an engagement end determination regarding the engagement-side friction engagement device if it has been determined for a predetermined time that an input shaft rotation speed of the automatic transmission is in a vicinity of a synchronous rotation speed of a post-shift gear step;
    setting the predetermined time at a first time if the downshift is a power-on downshift due to a shift judgment in a power-on state; and
    setting the predetermined time at a second time that is shorter than the first time if the downshift is a power-off→on downshift selected in connection with a change to the power-on state during a power-off shift due to the shift judgment in a power-off state.

8. The shift control method of the vehicular automatic transmission according to claim 7, wherein each of the first time and the second time is a constant value.

9. The shift control method of the vehicular automatic transmission according to claim 7, wherein each of the first time and the second time is set in accordance with a kind of shift.

10. The shift control method of the vehicular automatic transmission according to claim 7, wherein each of the first time and the second time is set in accordance with a kind of a friction engagement device involved in a shift.

11. The shift control method of the vehicular automatic transmission according to claim 7, wherein each of the first time and the second time is set in accordance with at least one of a vehicle speed, an engine rotation speed, the input shaft rotation speed, and a working oil temperature.

12. The shift control method of the vehicular automatic transmission according to claim 7, wherein the second time is determined at a time that varies depending on whether a shift is a multiplex shift to a relay gear step, or a multiplex shift that does not use a relay gear step, or a single shift caused merely by a change to the power-on state.

* * * * *